C. W. STEWART.
DRILL SHEARS.
APPLICATION FILED OCT. 31, 1907.
908,350.
Patented Dec. 29, 1908.
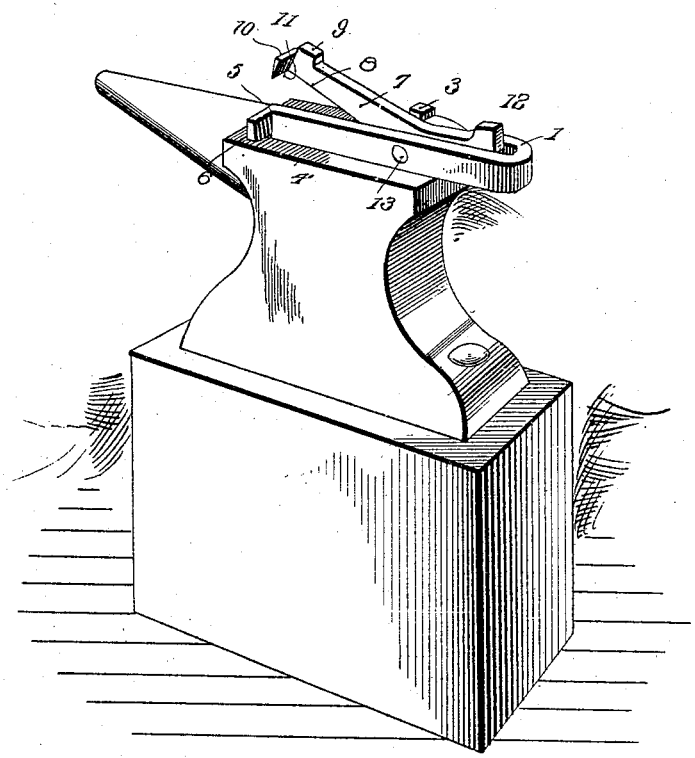
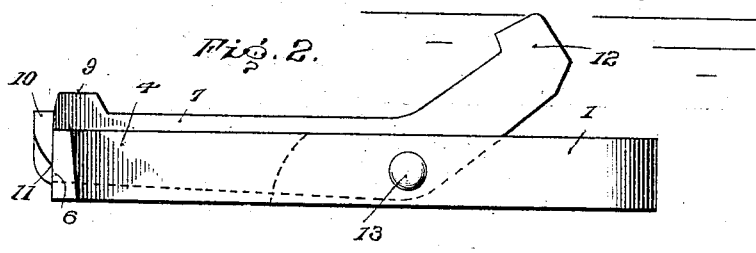
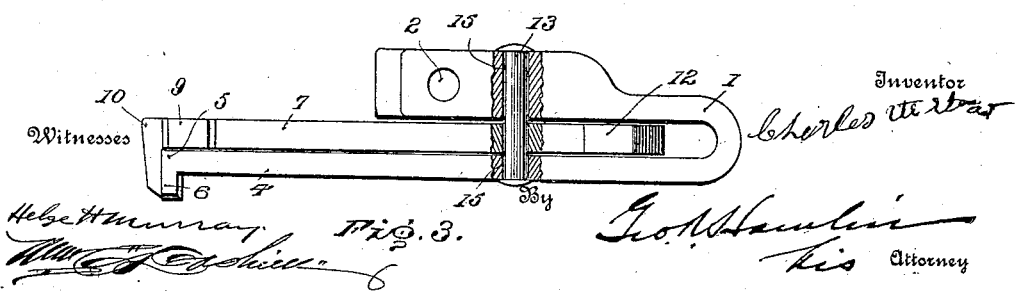

UNITED STATES PATENT OFFICE.

CHARLES W. STEWART, OF BRAZIL, INDIANA.

DRILL-SHEARS.

No. 908,350.  Specification of Letters Patent.  Patented Dec. 29, 1908.

Application filed October 31, 1907. Serial No. 400,124.

*To all whom it may concern:*

Be it known that I, CHARLES W. STEWART, a citizen of the United States, residing at Brazil, county of Clay, and State of Indiana, have invented certain new and useful Improvements in Drill-Shears, of which the following is a specification.

My invention relates to drill shears.

The bits of auger drills used in coal mining become worn off on the side after a certain amount of use, leaving the center of the auger in advance of the sides thereof, rendering it necessary for the blacksmith to cut the auger square off at its end and split it in the center, then making new corners so that the outside of the bit is in advance of the remainder thereof.

The operation of re-dressing auger bits is usually carried on by using a cold chisel to first cut off the auger cross-wise and then split the cut end but this is a laborious operation particularly for one man, besides which the anvil on which the work is carried on, becomes nicked and damaged.

The object of the present invention is the provision of a novel shears adapted for connection to an ordinary blacksmith anvil by which auger bits can be readily cut off and split when requiring such dressing.

The invention is carried out by the provision of a frame and a knife pivoted thereto, both of novel construction as set forth fully hereinafter.

The novel features of the invention are recited in the appended claims.

In the accompanying drawings:—Figure 1 shows the invention ready for use; Fig. 2 is a detail view of the invention alone when closed; and Fig. 3, a plan view, partly in section.

The parts of the device are by preference of cast steel and the device is located on the anvil lengthwise thereof as shown in Fig. 1.

The frame 1 is made in the form of a loop with an opening 2 through which a bolt 3 is passed to bolt the device to the anvil, the frame being laid on the latter lengthwise with the small end part toward the horn and the curved end projecting over the other end of the anvil. The end 4 is bent laterally at 5 and its face 6 is slightly inclined.

The numeral 7 designates the knife which is provided with a shear edge 8, an upwardly projecting head 9, and a laterally extending cutter 10 having a shear edge 11 adapted to coöperate with the face 6, while the opposite end of the knife is disposed angularly and provided with a head 12. The head 9 should be tempered so it will be tough enough to stand the hard blows to which it will be subjected. A bolt 13, passing through an opening in the knife and through openings 15 in the frame, pivots the knife between the loop parts of the frame.

In using the invention the worn auger is first placed upon the part 4 and the knife edge 8 brought down upon it. Securely holding the auger, the blacksmith delivers repeated blows on the head 9 until the knife edge 8 cuts through the end of the auger, making a square cut across its end. A few taps of the hammer on the head 12 throws the knife upwardly and the auger is then placed so that its center line is right over the edge 6 and the knife lowered so that the edge 11 rests upon the center part of the previously cut auger end. Blows being directed on the head 9, the edge 11 cuts clear through the auger end and splits it and the auger is then ready for use.

In one device the present invention provides means for both shearing off the worn end of the auger and splitting it and inasmuch as augers of this kind are from two to six or eight feet in length, and hence difficult to trim and split with a cold chisel, the present invention enables the operation to be carried on and in about one-fourth of the time required under the old method besides which the anvil is not marred in any way.

The device may be removed from the anvil when it is not desired for use.

Having thus described my invention, what I claim as new, and desire to secure by Letters Patent, is:—

1. An attachment for anvils comprising a frame having a shear edge and a flat lower face whereby it may be laid upon an anvil or other suitable surface, and a knife of angular form pivoted to the frame and having its ends extending upwardly and provided with a shear face flat from top to bottom adapted to coöperate with the shear edge of the frame, the angular formation of the knife permitting use of the attachment on the top of an anvil.

2. Shears for cutting and splitting drills and the like comprising a frame having a single shear blade extending outwardly therefrom, said frame being provided with a flat lower face whereby it may be laid upon an anvil or other suitable surface, and a knife of angular form pivoted to the frame and having its ends extending upwardly and provided with a shear face flat from top to bottom adapted to coöperate with the shear edge on the frame, the angular formation of the knife permitting use of the shears on the top of an anvil or other suitable surface.

3. Shears for cutting and splitting drills and the like comprising a frame having a shear edge and a splitting edge disposed angularly to each other, in combination with a knife pivoted to the frame intermediate the ends of said knife and having cutting parts coöperating with the shear edge and splitting edge aforesaid.

4. Shears for cutting and splitting drills and the like comprising a frame having a single arm extending outwardly therefrom having a shear edge at its side and a splitting edge at its end, in combination with a knife pivoted to the frame and having cutting parts coöperating with the shear edge and splitting edge aforesaid.

5. Shears for cutting and splitting drills and the like comprising a frame having a shear edge and a splitting edge disposed angularly to each other, said frame being provided with a flat lower face whereby it may be laid upon the anvil or other suitable surface, in combination with a knife of angular formation pivoted to the frame and having its ends extending upwardly and having cutting parts coöperating with the shear edge and splitting edge aforesaid, the angular formation of the knife permitting use of the shears on the top of an anvil or other suitable surface.

In testimony whereof, I hereunto affix my signature in presence of two witnesses.

CHARLES W. STEWART.

Witnesses:
HARRY W. JENKINS,
THOS. W. HUTCHISON.